United States Patent
Peters et al.

(10) Patent No.: US 10,821,535 B2
(45) Date of Patent: Nov. 3, 2020

(54) SHORT CIRCUIT WELDING USING SELF-SHIELDED ELECTRODE

(71) Applicant: Lincoln Global, Inc., Santa Fe Springs, CA (US)

(72) Inventors: Steven R. Peters, Huntsburg, OH (US); David Earle Mooney, Jr., Peninsula, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 625 days.

(21) Appl. No.: 15/460,918

(22) Filed: Mar. 16, 2017

(65) Prior Publication Data

US 2018/0264575 A1 Sep. 20, 2018

(51) Int. Cl.
*B23K 9/09* (2006.01)
*B23K 9/06* (2006.01)
(Continued)

(52) U.S. Cl.
CPC .............. *B23K 9/06* (2013.01); *B23K 9/0008* (2013.01); *B23K 9/092* (2013.01); *B23K 9/1056* (2013.01); *B23K 9/12* (2013.01); *B23K 9/173* (2013.01)

(58) Field of Classification Search
CPC .......... B23K 9/00; B23K 9/06; B23K 9/0008; B23K 9/092; B23K 9/1056; B23K 9/12
(Continued)

(56) References Cited

U.S. PATENT DOCUMENTS 4,717,807 A 1/1988 Parks
4,835,360 A 5/1989 Parks
(Continued)

FOREIGN PATENT DOCUMENTS

CN 201338151 Y 11/2009
EP 0965409 B1 5/2006
(Continued)

OTHER PUBLICATIONS

"Spatter Reduction in GMAW of Stainless Steel Sheets Using CBT Process" by Tatsuo Era, Akinobu Ide, Toshiro Uezono, Tomoyuki Ueyama, Yoshinori Hirata (www.tandfonline.com/doi/abs/10.1080/09507116.2011.606153), vol. 27, Iss. 4 of Welding International, published 2013—pp. 274-280 (7 pages).
"Spatter Reduction in GMAW by Current Waveform Control" by T. Era, T. Ueyama (www.tandfonline.com/doi/abs/10.1080/09507110701579647?journalCode=twId20) vol. 21, Iss. 7 of Welding International, published 2007—pp. 496-501 (6 pages).
(Continued)

*Primary Examiner* — Dana Ross
*Assistant Examiner* — Ayub A Maye
(74) *Attorney, Agent, or Firm* — Brad C. Spencer

(57) ABSTRACT

A welding system includes a feeder that advances a self-shielded flux-cored welding electrode toward a weld puddle. A power supply provides a welding output to the electrode to generate an arc, and a controller controls the welding output. The controller controls the power supply to provide a background welding output to the electrode before a shorting event between the electrode and a workpiece is detected. The controller monitors the welding output to detect both the shorting event and the clearance thereof. Upon detecting clearance of the short, the controller automatically switches the welding output to a minimum magnitude fixed current welding output. After the predetermined duration, the controller automatically switches the welding output from the minimum magnitude fixed current welding output back to the background welding output until another shorting event is detected.

18 Claims, 4 Drawing Sheets

(51) Int. Cl.
*B23K 9/00* (2006.01)
*B23K 9/12* (2006.01)
*B23K 9/173* (2006.01)
*B23K 9/10* (2006.01)

(58) Field of Classification Search
USPC .... 219/130.1, 130.01, 130.21, 130.5, 130.51
See application file for complete search history.

(56) References Cited

U.S. PATENT DOCUMENTS

| | | | |
|---|---|---|---|
| 4,866,247 A | 9/1989 | Parks | |
| 4,877,941 A * | 10/1989 | Honma | B23K 9/1056 219/130.21 |
| 4,897,523 A | 1/1990 | Parks | |
| 4,972,064 A | 11/1990 | Stava | |
| 4,984,221 A | 1/1991 | Dennis | |
| 5,001,326 A | 3/1991 | Stava | |
| 5,003,154 A | 3/1991 | Parks | |
| 5,148,001 A | 9/1992 | Stava | |
| 6,037,554 A * | 3/2000 | Innami | B23K 9/092 219/130.21 |
| 6,215,100 B1 | 4/2001 | Stava | |
| 6,326,591 B1 | 12/2001 | Hutchinson | |
| 6,331,694 B1 | 12/2001 | Blankenship | |
| 9,415,457 B2 | 8/2016 | Daniel | |
| 2002/0079302 A1 | 6/2002 | Hutchison | |
| 2003/0085210 A1 | 5/2003 | Hutchison | |
| 2004/0238513 A1 | 12/2004 | Hutchison | |
| 2006/0163229 A1 | 7/2006 | Hutchison | |
| 2006/0207979 A1 * | 9/2006 | Daniel | B23K 9/095 219/130.01 |
| 2007/0221643 A1 | 9/2007 | Narayanan et al. | |
| 2008/0006616 A1 | 1/2008 | Hutchison | |
| 2008/0087654 A1 | 4/2008 | Fulmer et al. | |
| 2008/0223840 A1 | 9/2008 | Era et al. | |
| 2012/0145690 A1 * | 6/2012 | Kawamoto | B23K 9/067 219/130.5 |
| 2013/0112675 A1 * | 5/2013 | Peters | B23K 9/093 219/130.51 |
| 2013/0228558 A1 | 9/2013 | Daniel | |

FOREIGN PATENT DOCUMENTS

| | | |
|---|---|---|
| EP | 1666183 B1 | 9/2012 |
| EP | 1775055 B1 | 4/2013 |
| EP | 2505294 B1 | 8/2016 |
| GB | 1447374 A | 8/1976 |
| JP | 1985130469 A | 7/1985 |
| JP | 2006122912 A | 5/2006 |
| JP | 2006334601 A | 12/2006 |
| JP | 2007075827 A | 3/2007 |
| KR | 20130053776 A | 5/2013 |
| WO | 1997032683 A1 | 9/1997 |

OTHER PUBLICATIONS

Extended European Search Report from Corresponding Application No. 18162250.7; dated Sep. 13, 2018; pp. 1-8.

* cited by examiner

SHORT CIRCUIT WELDING USING SELF-SHIELDED ELECTRODE

BACKGROUND OF THE INVENTION

Field of the Invention

Embodiments of the present invention relate to short circuit welding, and in particular short circuit welding using a self-shielded flux-cored welding electrode.

Description of Related Art

Short circuit welding techniques are known. One technique is the so-called Surface Tension Transfer (STT). In STT welding, a consumable wire electrode is energized by a welding power supply as it is driven toward a workpiece by a wire feeder. Background current establishes an arc between the wire electrode and the workpiece, and produces a molten ball at the end of the electrode. The molten ball is moved toward the workpiece by the wire feeder and eventually shorts against the workpiece, extinguishing the arc. A controlled pinch current that is greater than the background current causes the molten ball to pinch off from the wire electrode, and a subsequent plasma boost pulse is applied to the welding electrode to set the proper arc length and push the weld puddle away from the wire electrode.

STT welding is often used when low heat input is desired. STT welding is typically performed using solid wire electrodes. The welding process is protected by an external shielding gas that is discharged by the welding torch (e.g., gas metal arc welding—GMAW). Because STT welding requires an external shielding gas, it is generally limited to indoor welding. Outdoors, the shielding gas tends to blow away, resulting in poor weld quality. It would be desirable to perform STT type welding outdoors without having to use an external shielding gas.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding system. The welding system includes a self-shielded flux-cored welding electrode. A feeder is configured to advance the self-shielded flux-cored welding electrode toward a weld puddle during a welding operation. A power supply is configured to provide a welding output to the self-shielded flux-cored welding electrode to generate an arc between the self-shielded flux-cored welding electrode and a workpiece during the welding operation. A controller is operatively connected to at least the power supply for controlling the welding output to the self-shielded flux-cored welding electrode. The controller is configured to control the power supply to provide a background welding output to the self-shielded flux-cored welding electrode before a shorting event between the electrode and the workpiece is detected. The controller monitors the welding output of the power supply to detect both of the shorting event between the electrode and the workpiece and clearance of the shorting event. Upon detecting the clearance of the shorting event, the controller automatically switches the welding output to a minimum magnitude fixed current welding output to the self-shielded flux-cored welding electrode for a predetermined duration. Upon expiration of the predetermined duration, the controller automatically switches the welding output back to the background welding output until another shorting event between the electrode and the workpiece is detected.

In accordance with another aspect of the present invention, provided is a welding system. The welding system includes a self-shielded flux-cored welding electrode. A feeder is configured to advance the self-shielded flux-cored welding electrode toward a weld puddle during a welding operation. A power supply is configured to provide a welding output to the self-shielded flux-cored welding electrode to generate an arc between the self-shielded flux-cored welding electrode and a workpiece during the welding operation. A controller is operatively connected to the power supply for controlling a waveform of the welding output to the self-shielded flux-cored welding electrode. The waveform includes background portions that are each separated by a short circuit portion and a subsequent minimum magnitude fixed current portion. The controller is configured to control the power supply to provide the background portion before a shorting event between the electrode and the workpiece is detected. The controller is configured to monitor the welding output of the power supply to detect both of the shorting event between the electrode and the workpiece and clearance of the shorting event. Upon detecting the clearance of the shorting event, the controller controls the power supply so as to automatically switch the welding output to the minimum magnitude fixed current portion for a predetermined duration. Upon expiration of the predetermined duration, the controller controls the power supply so as to automatically switch from minimum magnitude fixed current portion back to the background portion until another shorting event between the electrode and the workpiece is detected.

In accordance with another aspect of the present invention, provided is a welding system. The welding system includes a self-shielded flux-cored welding electrode. A feeder is configured to advance the self-shielded flux-cored welding electrode toward a weld puddle during a welding operation. A power supply is configured to provide a welding output to the self-shielded flux-cored welding electrode to generate an arc between the self-shielded flux-cored welding electrode and a workpiece during the welding operation. A controller is operatively connected to at least the power supply for controlling a waveform of the welding output to the self-shielded flux-cored welding electrode. The waveform includes background portions that are each separated by a short circuit portion and a subsequent minimum magnitude fixed current portion. The controller is configured to control the power supply to provide the background portion prior to a shorting event between the electrode and the workpiece being detected. The controller is configured to monitor the welding output of the power supply to detect both of the shorting event between the electrode and the workpiece and clearance of the shorting event. Upon detecting the clearance of the shorting event, the controller automatically switches the welding output to the minimum magnitude fixed current portion for a predetermined duration. Upon expiration of the predetermined duration, the controller automatically switches from said minimum magnitude fixed current portion back to the background portion without a plasma boost pulse between the minimum magnitude fixed current portion and the background portion.

DETAILED DESCRIPTION OF THE INVENTION

Figure 1:
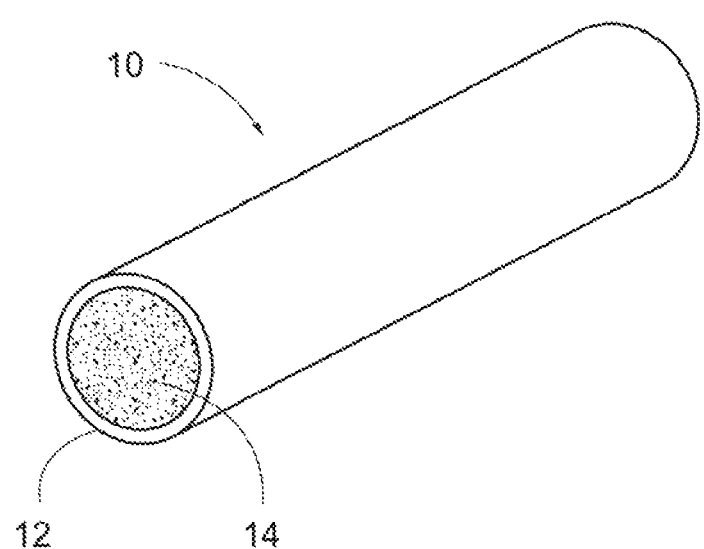
FIG. 1 is a perspective view of an flux-cored welding electrode.

Embodiments of the present invention relate to welding systems for performing short circuit welding operations. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

Electrical voltage and currents having negative values are discussed herein in terms of their magnitude. The magnitude of negative voltages and currents refers to their absolute values. For example, a negative voltage or current that increases in magnitude has a greater deviation from a reference voltage/current (0 V or 0 A). Conversely, a negative voltage or current that decreases in magnitude has less deviation from the reference voltage/current (0 V or 0 A).

Discussed herein are systems and methods for performing short circuit, self-shielded flux cored arc welding (FCAW-S). Electrical energy and waveforms for arc welding are provided by a welding power supply to a consumable wire electrode. The consumable wire welding electrode is a flux-cored electrode. A self-shielded flux-cored electrode 10 is shown in FIG. 1. The flux-cored electrode 10 includes an outer metal sheath 12 and an electrode core 14. The metal sheath 12 can be formed, for example, from carbon steel, stainless steel or some other type of metal or metal alloy. The composition of the metal sheath can be selected to be similar to the base metal component of a workpiece to be welded. The electrode core 14 includes fluxing agents and/or alloy and metals. Fluxing agents may include compounds to create a slag over the weld bead to protect the weld bead until it solidifies, to retain the weld bead in position until it solidifies and/or to shield the weld metal during the formation of the weld bead. The flux may include components which produce a shielding gas to protect a weld bead from the adverse effects of the environment. The flux components can include fluoride and/or carbonate to generate a shielding gas during welding so as to eliminate the need for external shielding gases. Thus, the flux-cored electrode 10 is "self-shielded". The use of such an electrode greatly simplifies the welding apparatus in that the need for a source and arrangement for an external shielding gas is eliminated. The slag which forms on the weld bead further shields the weld bead from the environment, thus resulting in the formation of quality weld beads.

The flux cored electrode 10 is used in a short circuit welding process, which is discussed below. During short circuit welding, the electrode is allowed to contact the workpiece to transfer molten metal to the workpiece. This results in a high electrical current through the electrode during the short circuit condition. The high electrical current can result in the electrode acting like a fuse and "blowing" or "exploding" as the molten ball on the end of the electrode separates from electrode and an arc is re-established. The forces generated during such an explosive event can create spatter, can disrupt the molten weld pool, and negatively affect the self-shielding produced by the electrode. Disruptions of the weld pool and self-shielding can result in an increased exposure of the weld puddle to atmospheric nitrogen, which can negatively impact the resulting weld. For example, increased nitrogen pickup can result in embrittlement of the heat affected zone (HAZ). Spatter is undesirable because it requires cleaning of the workpiece and can cause burns.

Nitrogen pickup and spatter can be reduced during short circuit welding by detecting when the molten ball is detaching or has just detached from the electrode and then quickly reducing the magnitude of the welding current. The welding system discussed below performs short circuit FCAW-S welding with an automatic post-short circuit reduction of welding current to minimize nitrogen pickup and decrease spatter. The reduced welding current allows for a more gentle separation of the molten ball from the welding electrode, rather than "blowing" apart like a fuse. A gentle separation of the molten ball from the welding electrode disrupts the weld pool and self-shielding less than a more explosive separation.

Figure 2:
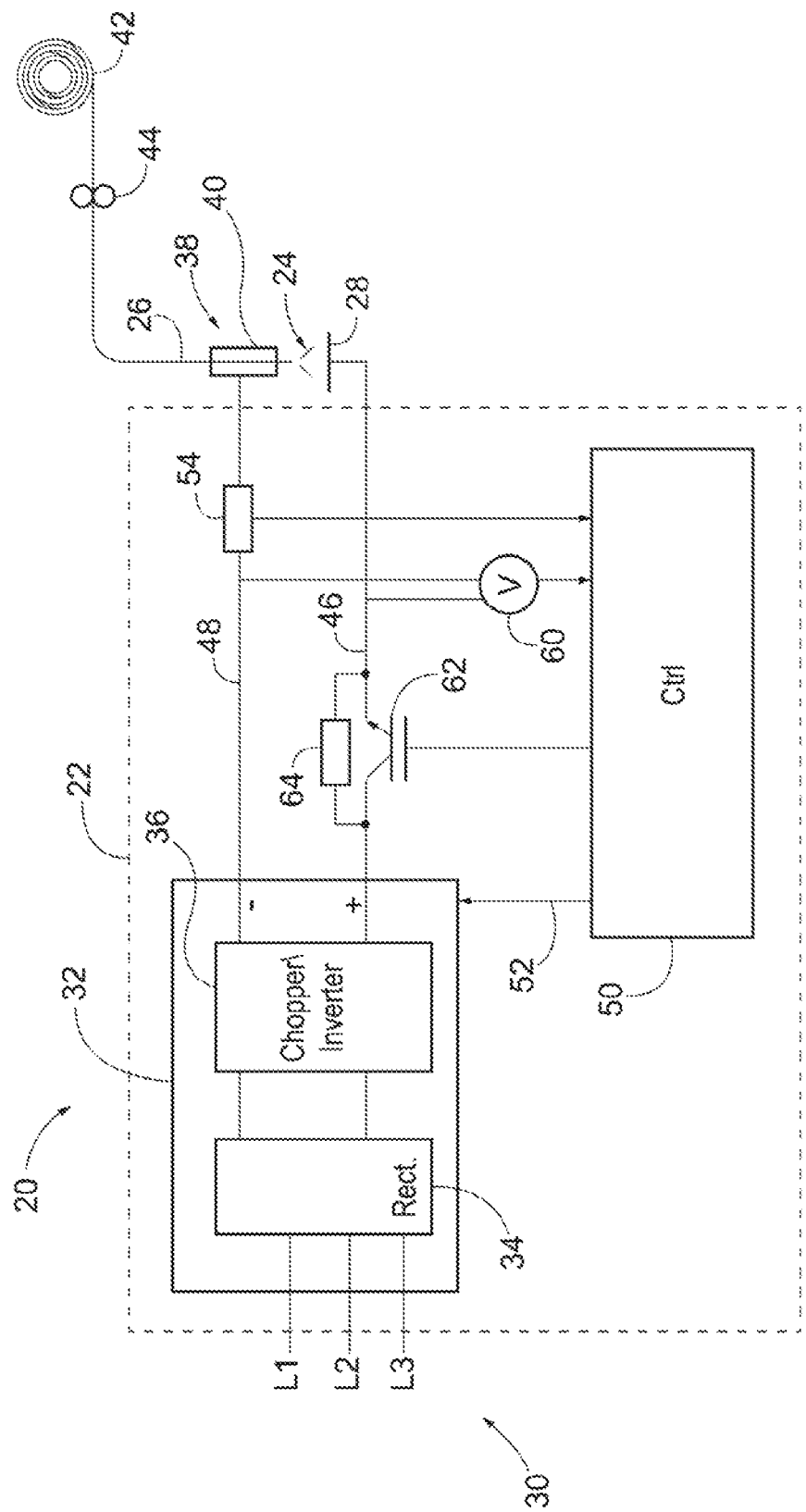
FIG. 2 is a schematic diagram of an example welding system.

A schematic diagram of an example arc welding system 20 is shown in FIG. 2. The arc welding system 20 includes a welding power supply 22. The welding power supply 22 generates an electric arc 24 between a self-shielded flux-cored welding electrode 26 and a workpiece 28 to perform a short circuit welding operation. The welding power supply 22 receives electrical energy for generating the arc 24 from a power source 30, such as a commercial power source or a generator. The power source 30 can be a single phase or three phase power source.

The welding power supply 22 includes a switching type power converter 32 for generating the arc 24 according to a desired welding waveform. Example switching type power converters 32 include DC choppers, inverters, and the like. AC power from the power source 30 is rectified by a rectifier 34 within the power converter 32. The DC output from the rectifier 34 is supplied to a switching circuit, such as chopper or inverter 36. The inverter 36 can supply high-frequency AC power to a transformer (not shown), and the output of the transformer can be rectified to DC power used to generate the arc 24. In certain embodiments, the arc welding system 20 can be a hybrid system that includes one or more batteries (not shown) that also supply energy to the power converter 32.

The arc welding system 20 includes a welding torch 38 that is operatively connected to the power supply 22. The power supply 22 supplies welding output electrical energy to the welding torch 38 to generate the arc 24 and perform the welding operation. In FIG. 2, the torch 38 has a contact tip 40 for transferring the electrical energy supplied by the power supply 22 to the electrode 26.

The electrode 26 is fed from a spool 42 by a feeder 44 configured to advance the electrode toward a weld puddle during the welding operation. As shown schematically in FIG. 2, the feeder 44 can include motor-operated pinch rollers for driving the electrode 26 toward the torch 38.

Electrical leads 46, 48 from the chopper/inverter 36 provide a completed circuit for the arc welding current. Most FCAW-S electrodes operate best on direct current electrode negative (DC−) or "straight" polarity. Such a configuration is shown schematically in FIG. 2, wherein the workpiece 28 is connected to the positive lead 46 from the power supply 22, and the contact tip 40 and electrode 26 are connected to the negative lead 48. Thus, a negative voltage is applied to the electrode 26 relative to the workpiece 28. The arc welding current flows from the chopper/inverter 36 through the workpiece 28, across the arc 24, through the electrode 26, and back to the chopper/inverter 36. In certain embodiments, the system can be configured for direct current electrode positive (DC+) or "reverse" polarity (not shown).

The power supply 22 includes a controller 50 operatively connected to the power supply (e.g., connected to the switching type power converter 32) for controlling the welding output to the self-shielded flux-cored welding electrode 26. The controller 50 is operatively connected within the power supply 22 to provide a waveform control signal 52 for controlling the output of the power supply. The controller 50 controls the output of the switching type power converter 32 via the waveform control signal 52, to achieve a desired welding waveform, welding voltage, welding current, etc. Specific example welding waveforms are discussed further below. If needed, the waveform control signal 52 can comprise a plurality of separate control signals for controlling the operation of various switches (e.g., semiconductor switches) within the switching type power converter 32.

The controller 50 monitors various aspects of the welding process via feedback signals. For example, a current sensor, such as a current transformer (CT) or shunt 54, can provide a welding current feedback signal to the controller 50, and a voltage sensor 60 can provide a welding voltage feedback signal to the controller.

The controller 50 can be an electronic controller and may include a processor. The controller 50 can include one or more of a microprocessor, a microcontroller, a digital signal processor (DSP), an application specific integrated circuit (ASIC), a field-programmable gate array (FPGA), discrete logic circuitry, or the like. The controller 50 can include a memory portion (e.g., RAM or ROM) storing program instructions that cause the controller to provide the functionality ascribed to it herein. The controller 50 can include a plurality of physically separate circuits or electronic devices, such as a processor in combination with separate comparators, logic circuits, etc. However, for ease of explanation, the controller 50 is shown as a monolithic device.

The power supply 22 can include a switch 62 (e.g., a transistor switch) that is controlled by the controller 50. During a welding operation, the switch 62 is normally maintained in the closed or conductive state, and welding current flows through the switch. A resistor 64 having a small resistance value (e.g., 1 or 2 ohms) or a snubber can be connected across the switch 62, to quickly reduce the welding current when the switch is opened. Opening the switch 62 (i.e., switching it to a nonconductive state) forces the welding current to flow through the resistor 64 or snubber, which quickly reduces the magnitude of the current to a level determined by the resistor 64 or snubber. Thus, as discussed below, the controller 50 can quickly reduce the magnitude of the welding current when desired by opening the switch 62. In certain embodiments, the switch 62 can be located in a module that is physically separate from the power supply 22, such as in a separate STT module for example.

Figure 3:
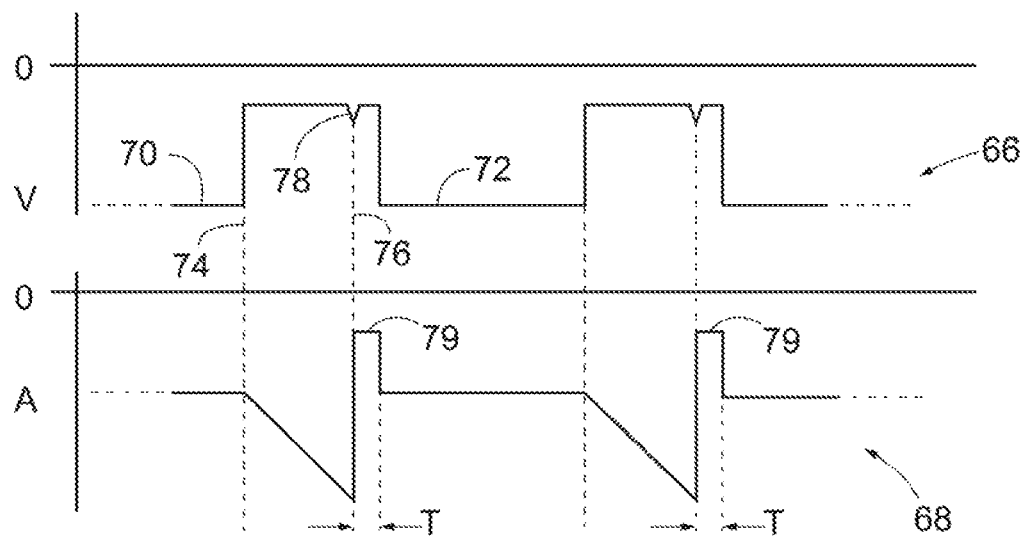
FIG. 3 is an example welding waveform.

FIG. 3 shows example welding voltage 66 and current 68 waveforms supplied to the electrode by the power supply, based on the waveform control signal 52 from the controller 50. Both waveforms are negative because of the direct current electrode negative (DC−) setup shown in FIG. 2. The voltage waveform 66 has background portions 70, 72 during which the power supply provides a generally constant voltage welding output to the electrode. A molten ball can be produced on the end of the flux-cored welding electrode during the background portions 70, 72.

As the electrode advances toward the weld puddle, eventually the molten ball on the end of the electrode will short into the weld puddle. This point is identified at 74 in the example waveforms. The background voltage/current portions of the welding waveforms occur until the shorting event 74 takes place. It can be seen that the voltage 66 magnitude drops dramatically at the shorting event 74, and the current 68 increases in magnitude. Because the controller is monitoring welding voltage and current, it can determine when the shorting event 74 occurs.

The maximum magnitude of welding current occurs during the shorting event. If left unchecked, the increased current magnitude will eventually result in the molten ball explosively separating from the electrode like a fuse, creating spatter and leading to nitrogen uptake in the weld as discussed above. However, by monitoring the voltage waveform 66, the controller can determine the molten ball's point of separation 76 from the electrode and quickly reduce the welding current to minimize the forces generated during separation. The voltage waveform 66 includes a signature increase in magnitude 78 during the short circuit portion, which the controller uses to identify the separation of the molten ball from the electrode. The controller can determine when the molten ball separates from the electrode from the voltage signal itself, its derivative, the voltage signal in combination with the current signal, etc.

When the controller determines clearance 76 of the shorting event, the controller automatically switches to current control for a predetermined brief duration of time, so that the power supply provides a minimum magnitude fixed current welding output 79 to the self-shielded flux-cored welding electrode for the predetermined duration T. The predetermined duration T can be chosen so as to minimize nitrogen uptake by the weld puddle and/or minimize spatter. In the system of FIG. 2, to reduce the welding current, the controller opens switch 62 which forces the welding current through the resistor 64 or snubber. This quickly reduces the magnitude of the welding current, as shown in FIG. 3. Opening the switch 62 can result in a very fast reduction in welding current, e.g., at a rate of at least 2 Amps per microsecond. The controller maintains the switch 62 in an open state for the predetermined duration T.

The minimum magnitude fixed current level 79 is determined primarily by the voltage output from the power supply and the impedance provided by the resistor or snubber. The minimum magnitude fixed current level 79 can be the lowest magnitude portion of the welding current waveform 68 as shown in FIG. 3. Regardless of whether or not an arc is detected, the controller keeps the switch 62 (FIG. 2) open and the welding current at a minimum magnitude within the current waveform 68 for a fixed, predetermined amount of time. As noted above, the welding current can be held at a minimum level for any amount of time deemed appropriate to avoid excessive spatter and nitrogen uptake. Example durations include less than 1 millisecond, less than 500 microseconds, less than 200 micro seconds, at least 150 microseconds, less than 100 microseconds, or even shorter durations.

In a particular example, the welding current can be reduced from a magnitude exceeding negative 250 A to a magnitude less than negative 50 A in about 66 microseconds (resulting in the magnitude of the current being reduced at a rate greater than 3 Amps per microsecond). The reduced current level can be held for about 160 microseconds.

When the predetermined duration for minimizing welding current expires, the controller closes the switch 62 and controls the power supply to automatically return to the background portion 72 of the welding waveform. The background portion continues until another shorting event is detected. Thus, in the example waveforms discussed above, the welding output includes only the background portions, short circuit portions, and minimum magnitude fixed current portions. In particular, the welding waveforms lack a plasma boost pulse after the short circuit portion and minimum magnitude fixed current portion, which is unlike conventional STT welding. That is, the power supply can directly return to a background portion without a plasma boost pulse, which might otherwise disturb the self-shielding provided by the electrode and lead to increased nitrogen uptake. However, any number of welding waveforms could be used if desired.

Figure 4:
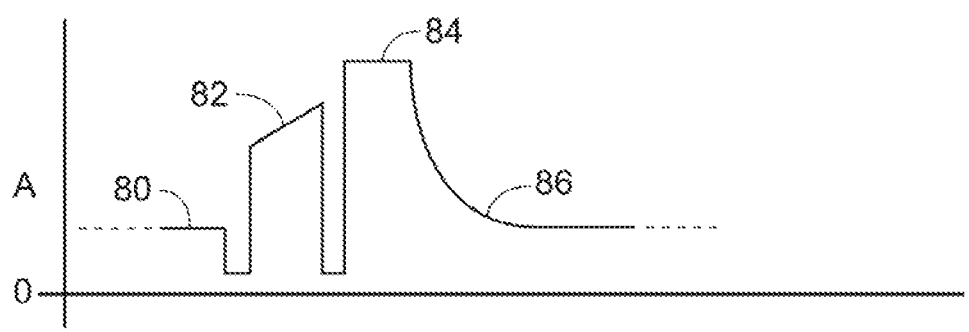
FIG. 4 is an example welding waveform.

For purposes of comparison, an example STT waveform is shown in FIG. 4. The STT waveform includes a background current portion 80, a pinch current portion 82, and a plasma boost pulse 84 followed by a tail out 86 to another background current portion. The STT waveform includes a plasma boost 84 pulse, which is missing in the waveforms of FIG. 3, and the STT waveform lacks a minimum magnitude fixed current portion having a predetermined duration. Clearance of a shorting event occurs in the STT waveform between the pinch current 82 and plasma boost pulse 84, and the transition from the pinch current to plasma boost is controlled based on monitored welding voltage or its derivative. Since the transition from pinch current 82 to plasma boost 84 in STT is based on the monitored welding voltage or its derivative rather than time, there is no minimum magnitude fixed current level for a predetermined duration upon detection of the clearance of a shorting event as found in the waveforms of FIG. 3.

Figure 5:
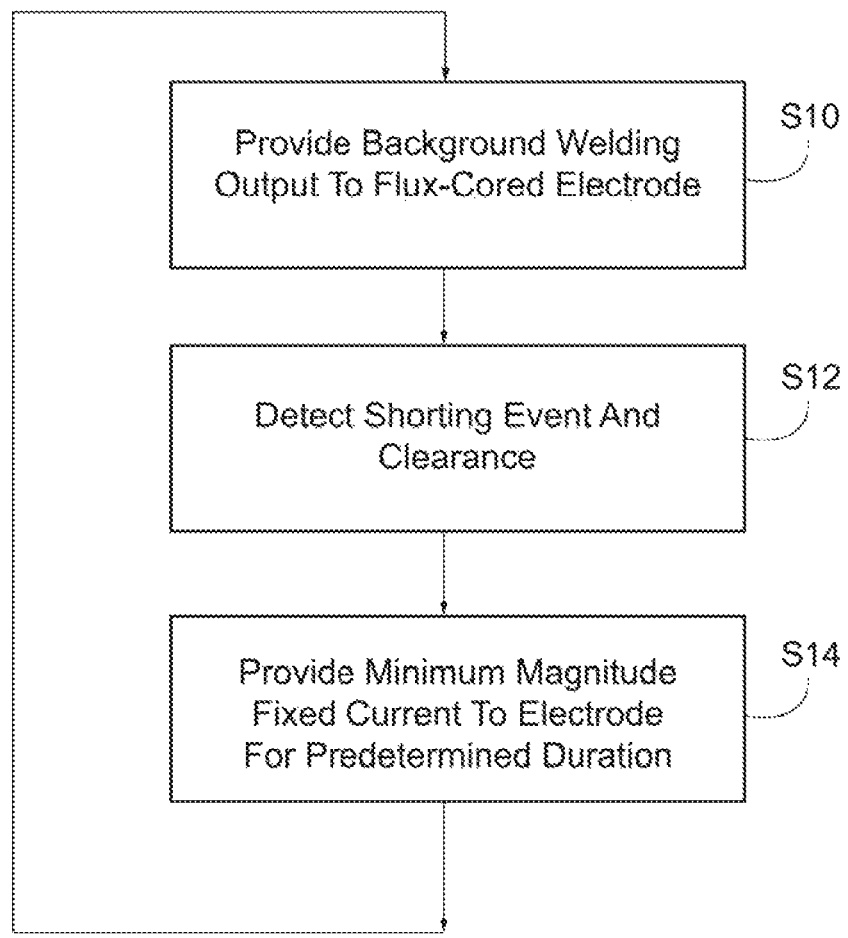
FIG. 5 is a flow diagram.

FIG. 5 provides a flow diagram of an example method for performing short circuit welding using a shelf-shielded flux-cored welding electrode. Initially, the welding power supply provides a background welding output to the self-shielded flux-cored welding electrode before a shorting event between the electrode and the workpiece is detected (step S10). The welding output of the power supply is monitored to detect both of the shorting event between the electrode and the workpiece and clearance of the shorting event (step S12). Upon detecting the clearance of the shorting event, the welding power supply automatically switches to current control to provide a minimum magnitude fixed current welding output to the self-shielded flux-cored welding electrode for a predetermined duration (step S14). Upon expiration of the predetermined duration, the welding power supply automatically switches from the current control back to providing the background welding output to the self-shielded flux-cored welding electrode until another shorting event between the electrode and the workpiece is detected.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding system, comprising:
a self-shielded flux-cored welding electrode;
a feeder configured to advance the self-shielded flux-cored welding electrode toward a weld puddle during a welding operation;
a power supply configured to provide a welding output to the self-shielded flux-cored welding electrode to generate an arc between the self-shielded flux-cored welding electrode and a workpiece during the welding operation; and
a controller operatively connected to at least the power supply for controlling the welding output to the self-shielded flux-cored welding electrode, wherein the controller is configured to:
control the power supply to provide a background welding output to the self-shielded flux-cored welding electrode before a shorting event between the electrode and the workpiece is detected,
monitor the welding output of the power supply to detect both of the shorting event between the electrode and the workpiece and clearance of the shorting event;
upon detecting the clearance of the shorting event, automatically switch the welding output to a minimum magnitude fixed current welding output to the self-shielded flux-cored welding electrode for a predetermined duration, and
upon expiration of the predetermined duration, automatically switch the welding output from said minimum magnitude fixed current welding output directly back to the background welding output and maintain the background welding output until another shorting event between the electrode and the workpiece is detected,
wherein the welding output is automatically switched from said minimum magnitude fixed current welding output directly back to the background welding output without a generation of a current pulse between the minimum magnitude fixed current welding output and the background welding output.

2. The welding system of claim 1, wherein a maximum magnitude of welding current during the welding operation occurs during the shorting event.

3. The welding system of claim 1, wherein the welding operation is a self-shielded welding operation lacking an external shielding gas.

4. The welding system of claim 3, wherein the power supply is operatively connected to the self-shielded flux-cored welding electrode and the workpiece such that a negative voltage is applied to the electrode relative to the workpiece.

5. The welding system of claim 1, wherein the predetermined duration is at least 150 microseconds.

6. The welding system of claim 1, wherein when automatically switching the welding output to provide the minimum magnitude fixed current welding output to the self-shielded flux-cored welding electrode upon detecting the clearance of the shorting event, the welding current magnitude is reduced at a rate of at least 2 Amps per microsecond.

7. A welding system, comprising:
a self-shielded flux-cored welding electrode;
a feeder configured to advance the self-shielded flux-cored welding electrode toward a weld puddle during a welding operation;
a power supply configured to provide a welding output to the self-shielded flux-cored welding electrode to generate an arc between the self-shielded flux-cored welding electrode and a workpiece during the welding operation; and
a controller operatively connected to the power supply for controlling a waveform of the welding output to the self-shielded flux-cored welding electrode, wherein the waveform includes background portions that are each separated by a short circuit portion and a subsequent minimum magnitude fixed current portion,
wherein the controller is configured to:
control the power supply to provide the background portion before a shorting event between the electrode and the workpiece is detected,
monitor the welding output of the power supply to detect both of the shorting event between the electrode and the workpiece and clearance of the shorting event;
upon detecting the clearance of the shorting event, control the power supply so as to automatically switch the welding output to the minimum magnitude fixed current portion for a predetermined duration, and
upon expiration of the predetermined duration, control the power supply so as to automatically switch from said minimum magnitude fixed current portion directly back to the background portion and maintain the background portion until another shorting event between the electrode and the workpiece is detected,
wherein the power supply automatically switches from said minimum magnitude fixed current portion directly back to the background portion without generating a current pulse between the minimum magnitude fixed current portion and the background portion.

8. The welding system of claim 7, wherein a maximum magnitude of welding current during the welding operation occurs during the shorting event.

9. The welding system of claim 8, wherein the waveform of the welding output includes only the background portions, short circuit portions, and minimum magnitude fixed current portions.

10. The welding system of claim 7, wherein the welding operation is a self-shielded welding operation lacking an external shielding gas.

11. The welding system of claim 10, wherein the power supply is operatively connected to the self-shielded flux-cored welding electrode and the workpiece such that a negative voltage is applied to the electrode relative to the workpiece.

12. The welding system of claim 7, wherein the predetermined duration is at least 150 microseconds, and
wherein when automatically switching the welding output to the minimum magnitude fixed current portion upon detecting the clearance of the shorting event, the power supply reduces welding current magnitude at a rate of at least 2 Amps per microsecond.

13. A welding system, comprising:
a self-shielded flux-cored welding electrode;
a feeder configured to advance the self-shielded flux-cored welding electrode toward a weld puddle during a welding operation;
a power supply configured to provide a welding output to the self-shielded flux-cored welding electrode to generate an arc between the self-shielded flux-cored welding electrode and a workpiece during the welding operation; and
a controller operatively connected to at least the power supply for controlling a waveform of the welding output to the self-shielded flux-cored welding electrode, wherein the waveform includes background portions that are each separated by a short circuit portion and a subsequent minimum magnitude fixed current portion,
wherein the controller is configured to:
control the power supply to provide the background portion prior to a shorting event between the electrode and the workpiece being detected,
monitor the welding output of the power supply to detect both of the shorting event between the electrode and the workpiece and clearance of the shorting event;
upon detecting the clearance of the shorting event, automatically switch the welding output to the minimum magnitude fixed current portion for a predetermined duration, and
upon expiration of the predetermined duration, automatically switch from said minimum magnitude fixed current portion directly back to the background portion and maintain the background portion until another shorting event between the electrode and the workpiece is detected, without a current pulse between the minimum magnitude fixed current portion and background portion.

14. The welding system of claim 13, wherein a maximum magnitude of welding current during the welding operation occurs during the shorting event.

15. The welding system of claim 13, wherein the welding operation is a self-shielded welding operation lacking an external shielding gas.

16. The welding system of claim 15, wherein the power supply is operatively connected to the self-shielded flux-cored welding electrode and the workpiece such that a negative voltage is applied to the electrode relative to the workpiece.

17. The welding system of claim 13, wherein the predetermined duration is at least 150 microseconds, and
when automatically switching the welding output to the minimum magnitude fixed current portion upon detecting the clearance of the shorting event, the welding current magnitude is reduced at a rate of at least 2 Amps per microsecond.

18. The welding system of claim 13, wherein the waveform of the welding output includes only the background portions, short circuit portions, and minimum magnitude fixed current portions.

* * * * *